United States Patent [19]

Sheppard

[11] Patent Number: 5,108,146
[45] Date of Patent: Apr. 28, 1992

[54] COWL GRILL TO WINDSHIELD LIP SEAL

[75] Inventor: Jonathan L. Sheppard, Ortonville, Mich.

[73] Assignee: Molmec, Inc., Walled Lake, Mich.

[21] Appl. No.: 733,678

[22] Filed: Jul. 22, 1991

[51] Int. Cl.⁵ .............................................. B62D 25/08
[52] U.S. Cl. ...................................... 296/192; 296/93
[58] Field of Search .................... 296/192, 93, 194; 15/250.19

[56] References Cited

U.S. PATENT DOCUMENTS

| | | | |
|---|---|---|---|
| 4,679,845 | 7/1987 | Detample et al. | 296/192 |
| 4,765,672 | 8/1988 | Weaver | 296/84.1 |
| 4,909,566 | 3/1990 | Hashimoto et al. | 296/192 |
| 4,982,993 | 1/1991 | Okazaki et al. | 296/192 |

FOREIGN PATENT DOCUMENTS 99115 1/1984 European Pat. Off. .
3611739 10/1987 Fed. Rep. of Germany .

*Primary Examiner*—Robert R. Song
*Attorney, Agent, or Firm*—Reising, Ethington, Barnard, Perry & Milton

[57] ABSTRACT

A cowl grill to window seal assembly of the type wherein the grill includes an edge disposed proximate a windshield, a flexible seal being adapted to snap over and be retained on said edge and which seal includes a protecting lip adapted to flexibly bias against and span the gap between the grill and windshield.

6 Claims, 2 Drawing Sheets

COWL GRILL TO WINDSHIELD LIP SEAL

TECHNICAL FIELD

The invention relates to an automotive cowl grill to windshield lip seal of the type which includes a curved windshield having a base portion, a cowl grill having an edge disposed proximate the windshield base portion and a flexible seal secured to the grill so as to span the space between the cowl grill and the windshield and which space can occur due to the proximate curvatures between the windshield and the adjacent cowl grill not matching.

The need for such a seal is twofold. First, the bottom edge of the windshield is suitably sealed to the vehicle body. Any gap between the windshield and the cowl grill will allow a substantial amount of water to impinge upon this body seal increasing the possibility of water leakage into the passenger compartment. Thus, the cowl lip seal diverts most of such water away from the windshield/body seal. Secondly, the cowl lip seal spans the gap between the cowl and the windshield to enhance the vehicle appearance.

BACKGROUND ART

At present, space between the windshield and the adjacent portion of the cowl is normally bridged by an elastomeric seal which is glued or otherwise adhered to the cowl edge nearest to the windshield and with a portion of the seal laying against the windshield. Such adhered seals can become loose either through improper initial bonding or due to prolonged exposure to the elements.

The present invention overcomes the problem of seal bonding by providing a seal and cowl construction which eliminates the need for bonding.

DISCLOSURE OF THE INVENTION

The present invention relates to a cowl grill to windshield lip seal wherein the seal is secured to the cowl without the use of adhesives or other mechanical fastening means. More specifically, the cowl and the seal are uniquely formed in such a way as to enable the seal to be snapped over the cowl edge and be retained thereon by virtue of an interlocking relationship between the seal and the cowl edge.

In the present invention relates to a curved windshield has a base portion disposed proximate the rear edge of a cowl grill and which edge has a curvature corresponding generally to that of the windshield. The lip seal has a curvature throughout its length generally corresponding to that of the windshield and includes a U-shaped body portion and an integral lip portion projecting from the closed end of the body portion so as to span the gap between the windshield and the cowl. The inner surface of the U-shaped body portion is notched or otherwise formed to provide a non-smooth or non-planar surface. At the same time, the top and bottom surfaces of the rear edge of the grill are formed so as to be complementary to the notched or grooved inner surface of the U-shaped body portion of the seal so that the seal can be snapped over the edge and retained thereon by the coacting seal and cowl edge elements.

In the preferred embodiment of the invention, the seal is of a dual durometer construction wherein the U-shape body portion is harder than is the lip. In this way, the harder element of the seal insures a firm connection with the edge of the cowl while the softer lip insures proper sealing with the windshield.

Other features of the present invention will be set forth in the detailed description which follows.

BEST MODE OF THE INVENTION

A transversely curved windshield is indicated generally at 10 which includes a lower base portion 12 adapted to be secured to a vehicle body through a suitable seal which is not shown. A cowl grill is indicated generally at 14 and is adapted to be secured to the vehicle body above and to the rear of the engine compartment. The cowl grill includes a rear edge portion 16 adapted to overlay the base portion 12 of the windshield. The cowl grill is intended to have a curvature which corresponds to the transverse curvature of the windshield. However, due to manufacturing tolerances there frequently is a gap, illustrated at 18 between the rear edge of the cowl and the windshield. The purpose of the present invention is to provide a new and improved seal, indicated generally at 20, to close the gap between the cowl and the windshield. The necessity for such a shield is first to prevent water from passing between the windshield and the cowl and thereby ultimately reducing the possibility of water entering the passenger compartment around the windshield and vehicle mounting seal not shown. Secondly, in closing or spanning such gap, the seal enhances the vehicle appearance.

While it forms no part of the present invention, it is to be noted that the cowl grill includes windshield wiper pockets or recesses 22 as well as open louvers 24 which enables water to drain through the engine compartment.

Figure 1:
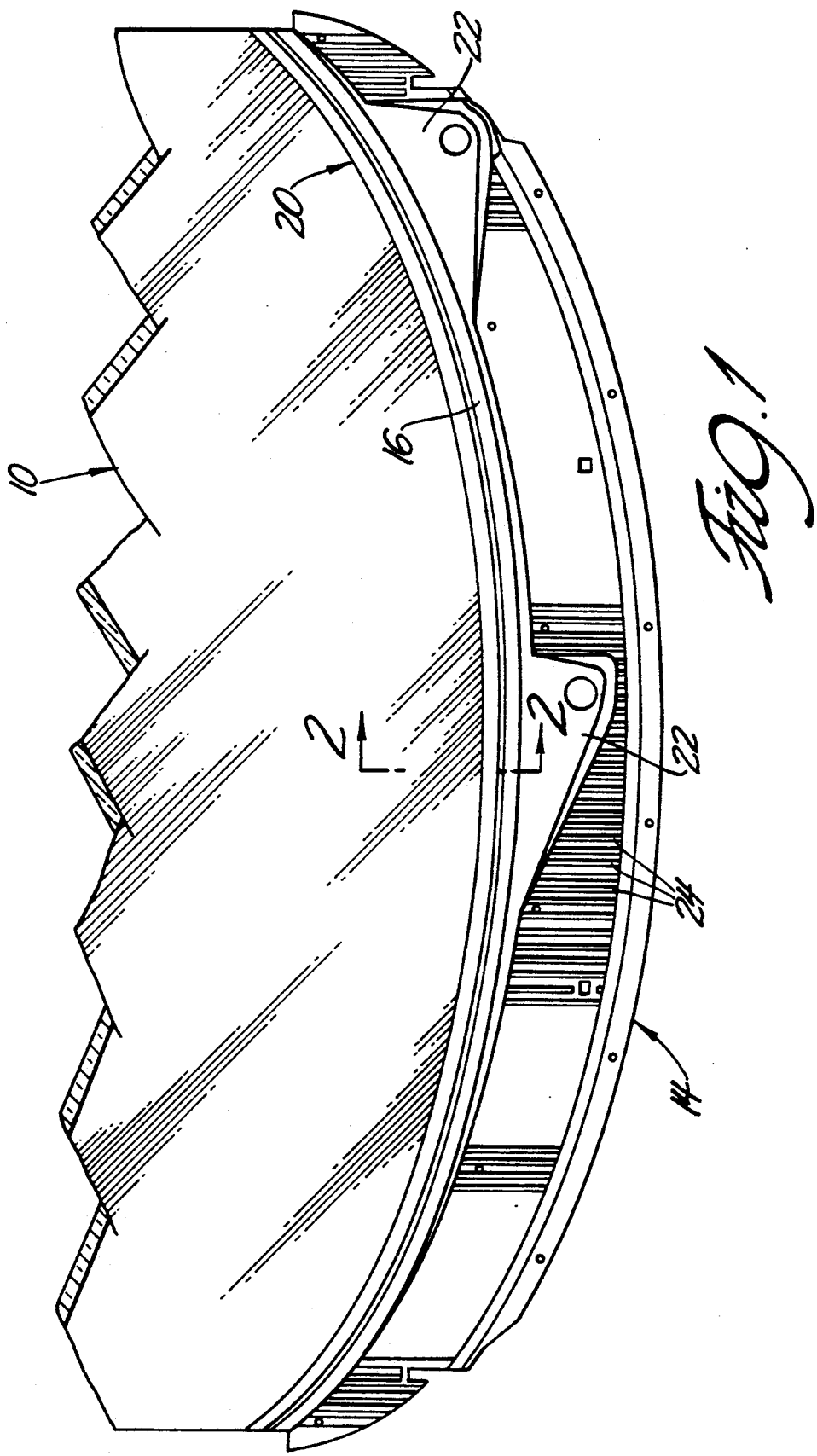
FIG. 1 is a partial view of a curved windshield, coacting cowl grill and intermediate lip seal.
Figure 2:
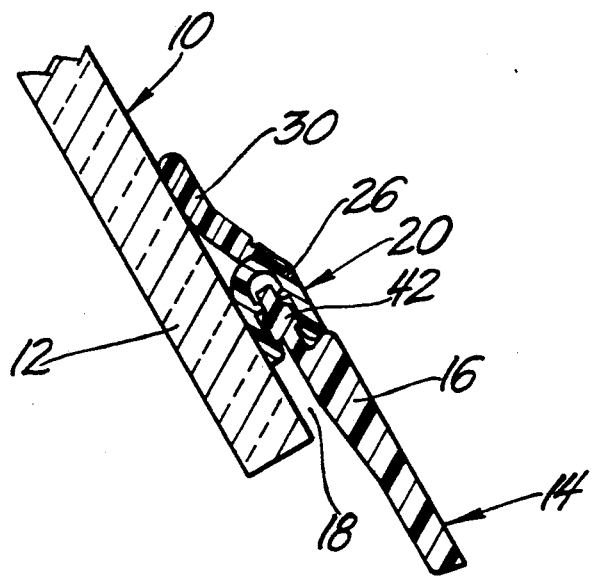
FIG. 2 is a view along line 2—2 of FIG. 1.
Figure 3:
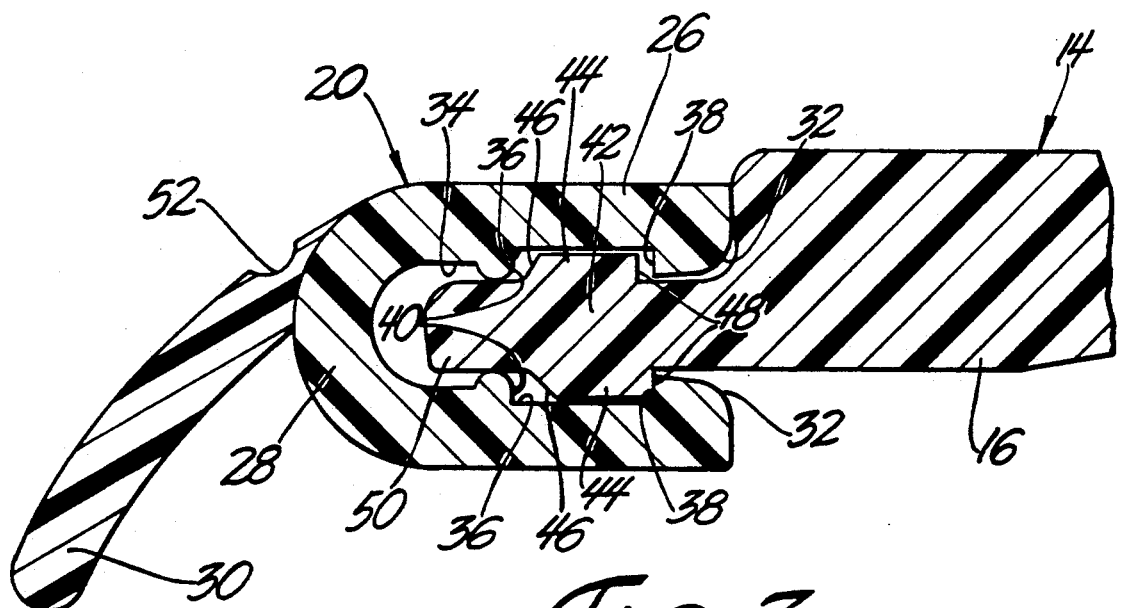
FIG. 3 is an enlarged view of the rear edge of the cowl grill having the lip seal mounted thereon.

FIGS. 1 and 2 of the drawings represent the seal 20 as mounted on the rear portion 16 of the cowl grill and in engagement with the windshield. FIG. 3 shows the lip seal mounted on the rear edge of the cowl grill and before being positioned in abutting relationship to the windshield.

Particularly referring to FIG. 3 of the drawings, seal 20 includes a U-shape body portion 26 from the closed end 28 of which projects a lip sealing portion 30. To allow the seal body portion 26 to be easily snapped over the coacting portion of the cowl, edges 32 at the open end of the body portion are rounded. Progressing toward the closed end 28 of body portion 26, the inner surface 34 of the body portion is molded or otherwise formed to provide oppositely facing notches or grooves 36. The edges 38 of the notch closest to the open end of the body portion are square or at right angles to the base of the notch while the forward edges 40 are rounded or radiused to facilitate insertion of the seal over the coacting portion of the cow grill.

The portion of the cowl adapted to coact with the seal will now be described. The rearmost portion of the cowl grill portion 16 includes a reduced or thinned edge portion 42 which is suitably formed to coact with the notched or grooved inner surface of the sealed body portion. More specifically, the cowl edge portion 42 includes oppositely disposed raised ribs 44 corrresponding generally in contour to the notches or grooves 36 of the seal body portion 20. The forward or leading edges 46 of the ribs 44 are rearwardly sloped to again facilitate insertion of the seal over the cowl edge portion 42. On the other hand, the rear edges 48 of the ribs are square and abuttingly engage groove edges 38 to retain the seal upon the cowl edge. The forward portion 50 of grill edge 42 projects within and toward the closed end of the seal body portion. Here again, the leading edge 42 of forward portion 50 is rounded to facilitate assembly of the seal upon the cowl edge.

Again and particularly referring to FIG. 3 of the drawings, it is apparent that in inserting or snapping the seal body portion 26 about edge portion 42 of the cowl grill, the rounded edges of the elements coact to facilitate entry of the edge portion within the seal body portion while the square or right angled edges 38 and 48 of the respective elements abut to facilitate retaining the elements in their assembled condition.

Lip seal portion 30 is integrally molded with the body portion 26 in such a way as to have a natural or what may be called a downward curvature. At the same time, the upper or top edge of the lip is formed with a groove 52 which extends throughout the transverse length of the seal to provide a hinge-like portion about which the seal can flex when mounted against the windshield.

At this point it is to be noted that in the preferred embodiment of the invention, the seal 20 is of a dual durometer hardness construction. More specifically, the seal may be of a plastic mixture of butyl and polypropylene and which material is marketed under the trademark SANTOPRENE marketed by Monsanto Chemical. While made of the same plastic materials, seal body portion 26 and lip 30 are of different durometers or hardnesses in order to facilitate their various functions. Seal body portion 26 is harder and may be of a durometer in the range of 40-60 on the Shore D hardness scale. On the other hand, lip seal 30 is softer and may be in the range of 60-70 on the Shore A hardness scale.

Being relatively hard through flexible, body portion 26 of seal 20 is more readily retained on the cowl grill edge 42. On the other hand, when the cowl grill is assembled to the vehicle, as seen in FIG. 2 of the drawings, lip seal portion 30 flexes upwardly or about its hinge-groove 52 so as to resiliently lay against the base portion 12 of the windshield to thereby seal the gap between the cowl grill and the windshield.

It is apparent that other modifications may be made within the intended scope of the invention as set forth in the hereinafter appended claims.

What is claimed is:

1. A cowl grill to windshield lip seal of the type including a curved windshield (10) having a base portion (12), a cowl grill (14) having an edge (42) disposed proximate the windshield base portion and which edge has a curvature corresponding generally to that of the windshield and a flexible seal (20) secured to the grill proximate the edge so as to contact the adjacent windshield, the improvement comprising:

the seal having a curvature throughout its length generally corresponding to the windshield curvature said seal including a U-shape body portion (26) and an integral lip portion (30) projecting from the closed end (28) of the body portion, the internal surface of the body portion having groove means (36), the outer surface of the grill edge (42) being formed as to be complementary to the grooved inner surface of the U-shape body portion of the seal, the U-shape body portion of the seal being adapted to snap about the grill edge and be retained thereto by said grooved and complementary grill surfaces, the grill edge and seal being positioned adjacent the windshield so that the outer portion of the seal lip resiliently biases against the windshield and above cowl edge.

2. A cowl grill to windshield lip seal as set forth in claim 1 wherein the seal is a dual durometer elastomeric material with the seal body portion (26) being harder than the lip (30).

3. A cowl grill to windshield lip seal as set forth in claim 2 wherein the hardness of the seal body portion is in the Shore D range of 40-60 and the lip in the Shore A range of 60-70.

4. A cowl grill to windshield lip seal as set forth in claim 1 wherein the seal lip (30) includes a groove (52) proximate the juncture with the body portion (26) and which groove extends the length of the seal to facilitate the lip's flexure relative to the body portion.

5. A cowl grill to windshield lip seal as set forth in claim 1 wherein the inner surface (34) of the seal body portion includes a pair of oppositely facing grooves (36) extending throughout its length, the cowl grill edge (40) including a pair of oppositely disposed ribs (44) adapted respectively to project within the grooves to retain the seal upon the cowl edge.

6. A cowl grill to windshield lip seal as set forth in claim 5 wherein the innermost edge (40) of each groove is rounded, the inner faces (46) of the ribs inclining toward the normal outer faces (48) of the ribs.

* * * * *